UNITED STATES PATENT OFFICE.

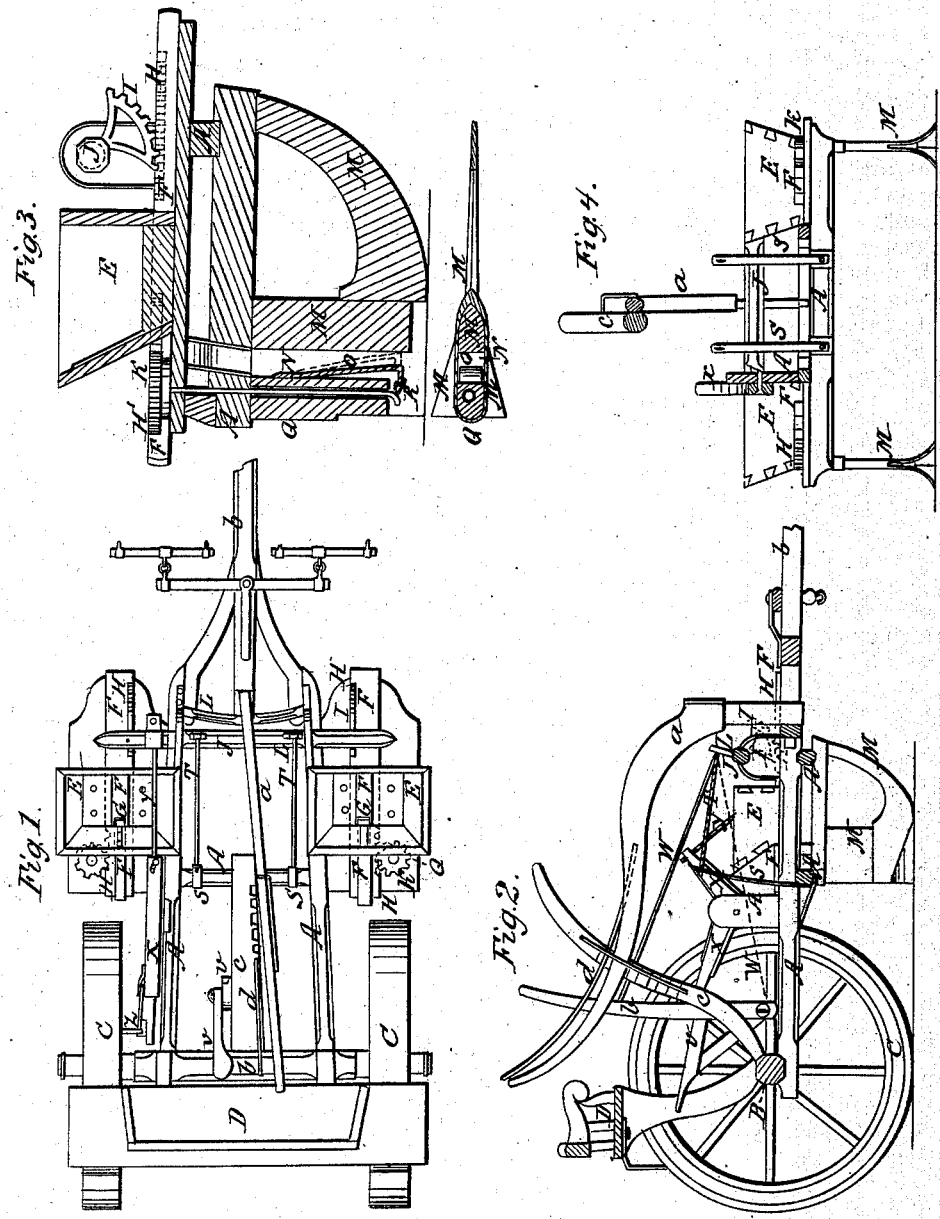

HENRY BELL, OF CLINTON, ILLINOIS, ASSIGNOR TO FENTON H. BOGAR AND JOS. W. TIDBALL.

IMPROVEMENT IN SEED-PLANTERS.

Specification forming part of Letters Patent No. 26,456, dated December 13, 1859.

*To all whom it may concern:*

Be it known that I, HENRY BELL, of Clinton, in the county of De Witt and State of Illinois, have invented a new and useful Improvement in Seed-Planters; and I do hereby declare that the following is a full, clear, and exact description of the same, reference being had to the accompanying drawings, forming a part of this specification, in which—

Figure 1 represents a plan view of the seed-planter; Fig. 2, a vertical longitudinal section through the center; Fig. 3, a detached sectional view; Fig. 4, a transverse section of the seed-planter; and Fig. 5, a horizontal section of the boot or furrow-opener.

Similar letters of reference in each of the several figures indicate corresponding parts.

The nature of my invention consists, first, in the arrangement and combination of a turning shaft, cog-segments, pinion, rock-shaft, rack-bars, springs, feed-slide, and discharge-regulating valve, in the manner and for the purpose hereinafter set forth.

It consists, second, in combination with the above, the arrangement of the treadle and hand-lever together and on the same fulcrum, so that the feed-slide can be worked either by the hand or foot, in the manner hereinafter described.

It consists, third, in combination with the foregoing peculiar arrangement of parts for dropping the seed, the arrangement for regulating the depth of the furrow-openers.

To enable others skilled in the art to make and use my invention, I will proceed to describe its construction and operation.

A represents the frame of the seed-planter, upon which are placed the devices for distributing the seed.

B is the axle.

C are driving-wheels.

D is the seat for driver or operator; E, hopper for seed to be planted.

F is a feed-slide; G, an adjustable receptacle in the feed-slide for receiving the amount of seed to be deposited at one time.

H H' are ratchet-bars, arranged on the feed-slide in the manner shown; I, cog-segments, by which, in connection with the rack-bars H, the feed-slide is worked.

J is a turning shaft, to which the segments I are attached.

K is a pinion-wheel worked by the rack-bar H' on the outside of the feed-slide.

L L are arms attached to the shaft J, and serving as a means whereby to operate the same.

M is the combined boot and colter, by which the furrow is made for the seed and the seed conducted into the same. The boot is constructed with a curved wing on each side, near its base and rear, so as to turn the soil in the same manner as a double-mold-board plow.

N is a passage through the hook, by which the seed is conveyed from the receptacle in the feed-slide to the bottom of the furrow.

O is a spring-valve within the passage, by which the seed is held so as to deposit it all in one place and at the proper time.

Q is a shaft with pinion K at its top. This pinion gears with the rack-bar H'.

R is a crank at the bottom of the shaft Q, and connected with the bottom of the spring O. As the shaft Q is turned the spring is drawn back by means of the crank and the passage opened for the seed to fall into the furrow. The red lines show it closed.

S are springs by which the feed-slide is drawn back, after having discharged the seed for one hill, to receive another charge.

T are rods or cords connecting the arms on the turning shaft with the springs S.

U is a lever by which the feed-slide can be worked by hand.

V is the treadle by which the lever is worked by the foot.

W is a rod connecting the lever U with arms L on the turning shaft. When the lever U is worked by hand the rod is attached to the lever near the top, but, when worked by the foot, should be attached near the bottom of the lever, as illustrated in red.

X is an angular lever placed upon the frame A, on the inside of one of the driving-wheels, behind the hopper, for the purpose of working the feed-slide by the action of the driving-wheel.

Y is a cord connecting the angular lever with an arm of the turning shaft.

Z is a pin or rod projecting from a spoke in the driving-wheel, and at each revolution of the wheel acting upon the rear end of the angular lever, and, through the cord Y and turning shaft, upon the feed-slide, and thus effecting a deposit of seed in the furrow at every revolution of the wheel.

$a$ is a lever attached to near the rear end of the tongue of the seed-planter, by which the depth of the furrow can be regulated. By raising the rear end of the lever the forward end of the tongue is depressed and the combined boot and colter or furrow-opener is raised, so as to make a shallow furrow. By depressing the rear end of the lever the forward end of the tongue is raised and a deeper furrow made.

$b$ is the tongue of the seed-planter.

$c$ is an adjusting-standard by which the lever $a$ is held in any desired position.

$d$ is a spring on the side of $a$, fitting into notches in the standard $c$ and holding it in place.

In the operation of this machine it will be seen that the man who drives the horses by which it is drawn can work the feed-slide by one hand or by his foot; or it may be worked with the driving-wheel. The feed-slide being worked by the cog-segments and ratchet-bars, its operation must be sure and not liable to get out of order. The receptacle for seed in the feed-slide being adjustable, the machine can be adjusted for planting a larger or smaller amount of seed at a time, as may be desired. The spring or valve in the boot secures its being dropped together at the proper time into the furrow. As the feed-slide is drawn into the hopper the valve is opened in the boot and the seed dropped into the furrow, and the spring then closes the passage to receive another supply from the feed-slide. The flaring or mold-board form of the rear of the boot secures the falling of the earth displaced in making the furrow upon the seed after being deposited in the bottom of the furrow, and the wide tire of the driving-wheel passes over and presses the earth down upon the seed, thus securing a more perfect germination.

The furrow may be made of any required depth by adjusting the lever attached to the tongue of the seed-planter; or the boot may be raised so as not to touch the ground where a furrow is not desired.

The simplicity and compactness of construction of my seed-planter and convenience and certainty of its action render it far preferable to other seed-planters which have their slides worked by cogged gearing.

I have only described the machine as having one slide and the necessary appurtenances thereto, in order to facilitate the description. In practice, however, I use two slides and necessary appurtenances, the same being combined so as to be operated together in the manner represented in the drawings.

What I claim as my invention, and desire to secure by Letters Patent, is—

1. The arrangement and combination of the rock-shaft J, cog-segments I, pinion K, crank-shaft Q R, ratchet-bars H H', springs S S, feed-slide G, and discharge-regulating valve O, when the same are arranged and combined in the manner herein set forth.

2. In combination with the above, the arrangement of the treadle V and hand-lever U together and on the same fulcrum, so that the feed-slide can be worked either by the hand or foot, substantially as and for the purposes herein set forth.

3. In combination with the foregoing peculiar arrangement of parts for dropping the seed, the arrangement of $a\ b\ c\ d$ for regulating the depth of the furrow-openers, substantially as and for the purposes set forth.

HENRY BELL.

Witnesses:
 ALEX. M. DYE,
 JOSEPH H. HUMPHRYS.